United States Patent [19]
Grainer et al.

[11] Patent Number: 5,127,959
[45] Date of Patent: Jul. 7, 1992

[54] PROCESS FOR DISPOSAL OF A FIRE-EXTINGUISHING FOAM OR OF OTHER FOAMS

[75] Inventors: Nikolaus Grainer, Odenthal-Blecher; Reiner Roy, Leichlingen, both of Fed. Rep. of Germany

[73] Assignee: Total Walther Feuerschutz GmbH, Cologne, Fed. Rep. of Germany

[21] Appl. No.: 585,244

[22] Filed: Sep. 19, 1990

[30] Foreign Application Priority Data

Sep. 20, 1989 [DE] Fed. Rep. of Germany ....... 3931311

[51] Int. Cl.⁵ .............................................. B08B 5/04
[52] U.S. Cl. ...................................... 134/21; 134/33; 55/45; 55/438; 55/459.1; 210/787
[58] Field of Search ............... 134/21, 33; 55/45, 438, 55/459.1; 210/787

[56] References Cited

U.S. PATENT DOCUMENTS

| | | | |
|---|---|---|---|
| 4,746,440 | 5/1988 | Seeger | 210/703 |
| 4,874,589 | 10/1989 | Görlich | 210/673 |
| 4,974,618 | 12/1990 | Nysted | 134/21 |

FOREIGN PATENT DOCUMENTS 0925371  7/1982  U.S.S.R. ................ 55/438

*Primary Examiner*—Theodore Morris
*Assistant Examiner*—Zeinab El-Arini
*Attorney, Agent, or Firm*—Horst M. Kasper

[57] ABSTRACT

The invention comprises a method and an apparatus for the waste disposal of light and/or medium and/or heavy foams employed in connection with fire extinguishing or the like. The foam is sucked in by a blower or the like, is disintegrated and in the following, is concentrated in a following container. The larger part of the air is thereby separated from the foam and the foam is reduced in a further-following separating stage to the volume of the initially employed foaming agent water mixture. The separating stage can be a centrifuge or a cyclone. Upon waste disposal of a low foamed heavy foam, this heavy foam is sucked up with a pump and in the following the pump is separated. In both cases following, the mixture is fed to a further waste disposal stage.

15 Claims, 5 Drawing Sheets

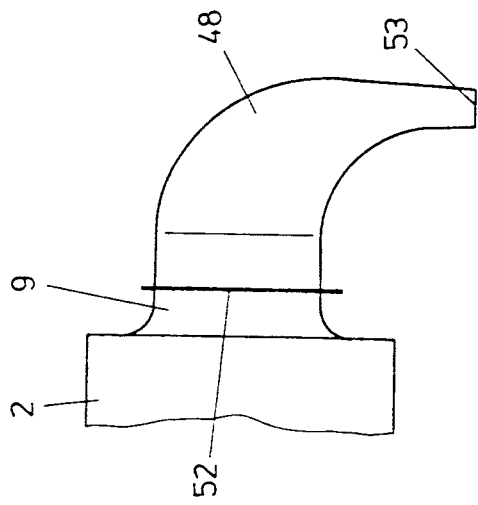
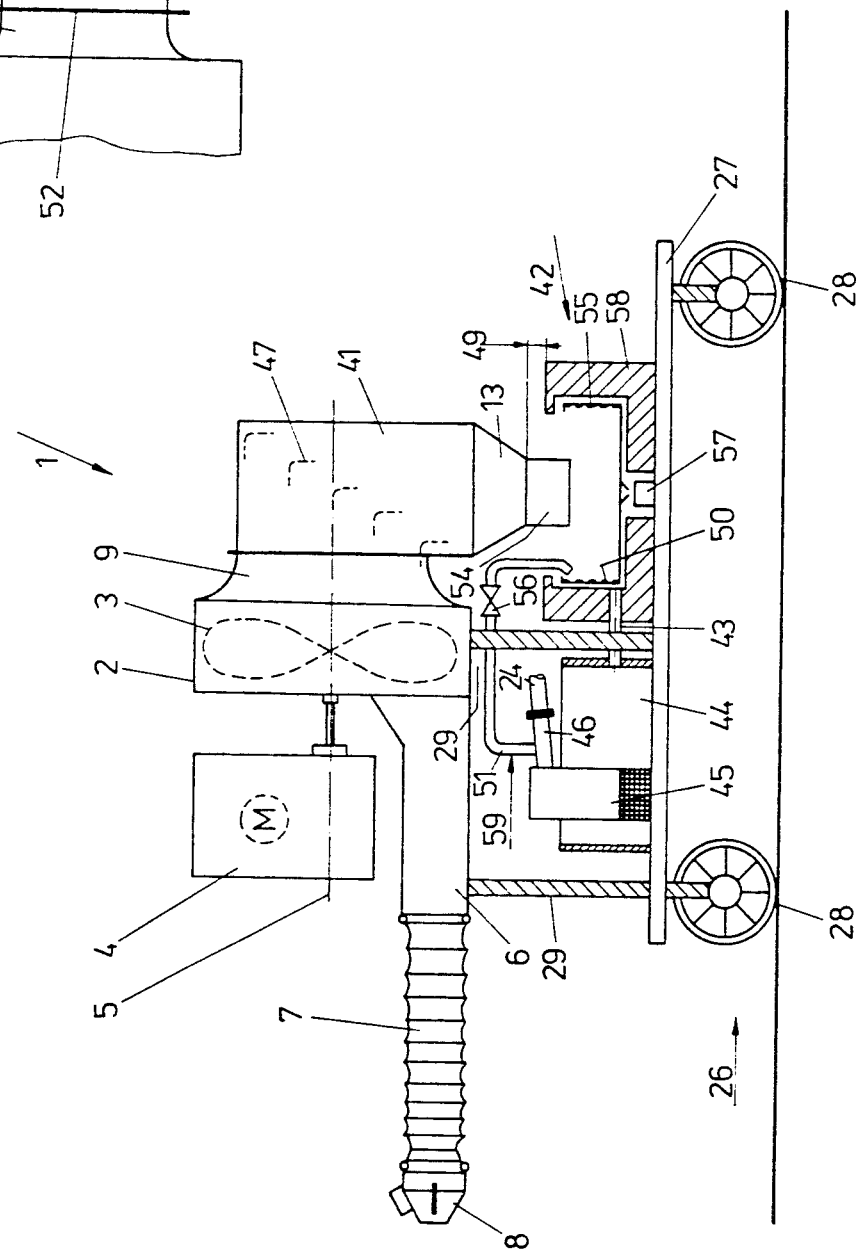
Fig. 4
Fig. 3

PROCESS FOR DISPOSAL OF A FIRE-EXTINGUISHING FOAM OR OF OTHER FOAMS

BACKGROUND OF THE INVENTION

1. Field of the Invention

The invention relates to a method for the waste disposal of a high, and/or medium, and/or low expansion foam employed in connection with fire extinction.

2. Description of the Background of the Invention Including Prior Art

An air-foam method is used in connection with fire-extinguishing foams, where water is transformed into a phase having a lower specific weight, in particular in relation to ignitable and flammable liquids. For this purpose, a foaming-agent is admixed to a water stream and the foamable solution is foamed in a foam generator by drawing in of air. Foamable materials, which are employed for the formation of foam, are designated as foaming-agents. These foaming-agents are in part based on synthetic materials and they comprise for certain application compositions also special fluorotensides, which exhibit, on the one hand, an improved extinguishing effect but which, on the other hand, represent difficulties in connection with waste disposal. High, medium, or low expansion foam can be generated from a predetermined mixture of water and a corresponding foaming agent. The kinds of foams are defined according to their foaming numbers, i.e. the ratio of the unfoamed mixture relative to the generated foam volume. A high expansion foam has an expansion ratio of the fire foam of from 4 to 20, a medium expansion foam of from 20 to 200, and a low expansion foam of over 200 up to 1000. It can be recognized from this that both medium as well as high expansion foam result in large volumina of foam.

Fire-extinguishing foam is employed not only in case of a fire. It is indispensable to generate an extinguishing foam for test purposes. Fixed high and medium foam foam systems have regulators approval after a successful project performance involving a foam-generation test. In addition, foam carpets have to be generated in a mobile application for training of fire-fighters. The taking down and removal, decomposition and disposal of large volumes of high or medium expansion foam is accompanied today by substantial difficulties based on environmental protection considerations. The foaming agents, required for the generation of the foam, can in fact be biologically degraded. Nevertheless, the direct discharge of the foaming-agents into the ground water or into canals or, respectively, into a water-clarifier and water-treatment plant, or into a sewage-treatment plant, results in a sudden change of the equilibrium present in such plant and can thus lead to a disturbance of the water biology and water chemistry present in such plant and in the ground water and waterways. For this purpose, statutory limiting values have been fixed in various jurisdictions, which define a maximum permissible feeding of such foams per time unit into a channel grid. These statutory limits can practically not be maintained during the waste disposal of test foams or in case of foams actually applied in case of a fire.

The large volumes of foam generated had to be precipitated in the past with large amounts of water. Another method comprises in allowing the foam to rest and remain such that it is allowed to disintegrate and decompose by itself. However, this method requires a substantial amount of time.

SUMMARY OF THE INVENTION

1. Purposes of the Invention

It is an object of the invention to provide a method and a device which allows to dispose of high, medium, and low expansion foams appropriately with regard to environmental considerations and without use of additional water and within a short time-span.

It is a further object of the invention to provide a method which allows a recovery of the liquid contained in a foam generated for fire-fighting purposes.

These and other objects and advantages of the present invention will become evident from the description which follows.

2. Brief Description of the Invention

In accordance with the invention, the foam is drawn in with a blower, is fed through this blower and is thereby disintegrated into a heavier consistency fluid based on an increase of the exit speed. This heavier fluid is then further concentrated by separation of the largest part of the contained air, and the residual air is separated from the foaming-agent water mixture in a subsequent stage for a further treatment.

This post treatment of the foam-air mixture can be performed in a collection container with a pump and a following cyclone or with a centrifuge with a following pump.

The reduced foam, separated from a large part of the air previous contained therein, exhibits an expansion ratio of the foam of less than 4 and can be further treated without difficulties in this constitution and/or can be further disposed of without difficulties.

The present invention is associated with the advantage that the foam does not have to be further diluted with water or, respectively, be precipitated. Thus a proper waste disposal of the foam is assured without any water addition.

After a separate precipitation of the residual air, the foaming-agent water mixture can be filled for further waste disposal either into a container or into a tank truck. The tank truck can be moved to a water clarifying plant or to a sewage plant, where the mixture is added in a second step in a reasonable amount per time unit to the water-clarifying plant. It is further possible to perform the waste disposal at this specific location by leading the foaming-agent water mixture into a precipitation stage and/or a filter stage, wherein foaming-agent and water are separated under addition of a flocculation and/or coagulation auxiliary agent. The thus generated pure water can be either further employed or can be led without difficulties into a canal system. A foaming-agent binder is added in the precipitation stage, and the foaming-agent is bound to the foaming-agent binder and thus can be separated from the water. This process can be performed in a single unit. The mixture is fed for this purpose into a large precipitation container, where the size of the precipitation container depends on the mixture volume employed. The foam components are precipitated by addition of a flocculation auxiliary agent and the foam components can deposit and settle. The pure water, standing over the sediment, can be pumped off, whereas the sediment can be carried out and moved to a waste discharge location or to an incinerator.

The foaming-agent water mixture alternatively can also be fed to a mixing member, wherein a flocculation auxiliary agent is added to the mixture. An instantaneous cloudiness and flocculation of the disolved foaming-agent is achieved by suitable selection of a flocculation auxiliary agent, whereby the foaming agent can be separated from the pure water in a following filter. The precoated filters or multiple tube filters are washed back and flushed back, whereby the residue is disposed of via a sanitary land fill, a dump, or by combustion. The waste disposal of the single use filters is performed in an analogous fashion.

The foam to be disposed of can be drawn off by a blower via a tube. Foam generators are available in professional fire fighting units, in factory fire fighting units, and in other institutions. This foam generator apparatus generates at the specific location foam, which is non-storable. High expansion foam generators are furnished at the discharge connection pipe with a diffusor and with a purifier grid, which generate the foam. If the diffusor and the purifier grid are removed, as well as the air-suction opening covered, then the generator can serve as a blower, where the catch container for the foaming-agent water mixture can be disposed at the exit connection pipe of the foam generator.

The disintegrated and concentrated foam is drawn off by way of a pump and is further reduced during passage through the pump and in a following cyclone. The blower has to be driven by a motor. According to a further preferred embodiment, it is provided that the pump is driven by a drive motor of the blower.

The disintegrated foam can also be reduced in a sieve centrifuge with a metallic or textile sieve cover, where the further reduced foam is fed via a container with an immersion pump to the waste disposal.

Both in case of a fire, as well as in the case of a test foam generation, mountains of foam are generated which can have heights of several meters. If the test foaming occurs, for example, in a hall having a base foundation with a size of 50×100 meters, then the result is in case of a 2 meter high foam mountain of a volume of 10,000 m$^3$. In order to discharge such a foam mountain, the waste disposal unit is preferrably driven through the foam. It is particularly advantageous in such a case that a meander-shaped disposal path is employed. This means that the waste disposal unit, for example, enters the hall and into the foam, at one side wall of the hall, goes up to the end of the hall then turns, returns to the starting point, turns again and again is driven to the hall end. In this manner, the complete hall is very quickly and reliably relieved of the foam. In order to perform this waste disposal method, it is advantageous that the waste discharge unit is placed onto a movable support, wherein a worker leads the suction tube and a second worker moves the support wagon.

A particularly advantageous embodiment of the apparatus for performing of the waste discharge method comprises that a collection container for the disintegrated foam is connected at the discharge connection pipe of the blower or of the foam generator and that said collection container comprises a charge opening for the disintegrated foam, where the collection container comprises an impactor wall disposed opposite to the charge opening and where a ventilation connection pipe is disposed in the upper part of the collection container and where a discharge connection pipe is furnished in the region of the lower part of the impact wall. The impact wall is inclined relative to a horizontal, where the slope angle runs at, preferrably, from about 45° to 65° relative to the horizontal. This impact wall has the effect that the foam disintegrated in the blower flows against the inclined impact wall, is banked and backed up at the inclined impact wall and thereby is pressed by the following foam into the discharge connection pipe, where it can be sucked up by the pump. A cyclone is furnished behind the pump, and the residual air is separated from the liquid phase in the cyclone. For this purpose, a funnel is furnished in the lower part of the collection container. The collection container can further be formed as a turn channel with deflection sheet metal pieces without a ventilation connection pipe, where a sieve centrifuge is disposed under the collection container for a further reduction of the foam volume. Based on the distance between the discharge connection pipe of the collection container and the centrifuge, a large part of the air can escape from the residual foam at this location. Furthermore, an extension pipe can be furnished which protrudes into the centrifuge. The remaining foam-liquid mixture flows into an intermediate container and is pumped off from there.

In order to suck up the residual foam without difficulties, in particular, in application situations without a centrifuge and in order to be able to pump off the residual foam, it is advantageous to employ a pump, which is regenerative, self-priming, safe against dry run and corrosion resistant.

At the most, the 2 through 4 fold volume of the originally employed foaming-agent water mixture flows off behind the centrifuge or, respectively, the cyclone. This flowing-off mixture can now be fed by various means to a final waste disposal.

In case of a treatment of a low expansion foam with a foaming number under 10, the foam is sucked off by way of a suction pump.

The air separation can be performed in a centrifuge or in a cyclone. Also, in case of such a requirement, a cyclone can be connected following to the centrifuge. Waste disposal method and apparatus are described in more detail in the specific embodiments.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 3 is a side-elevational view of a further embodiment of the waste disposal apparatus.

FIG. 4 is a side-elevational view onto a further embodiment of a collection container.

DESCRIPTION OF INVENTION AND PREFERRED EMBODIMENT

Figure 1A:
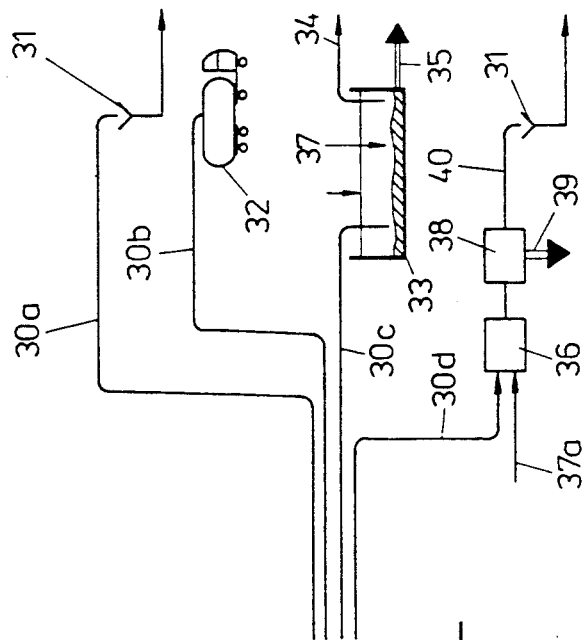
FIG. 1a is a view of a schematic diagram relating to various methods of the residual waste disposal.

The apparatus 1 for the discharge of the fire extinguishing foam or the like comprises substantially a blower 2, a collection container 10, a pump 15, a cyclone 22, and a following discharge device 31 or 32 or 33 or 36, 38.

Figure 1:
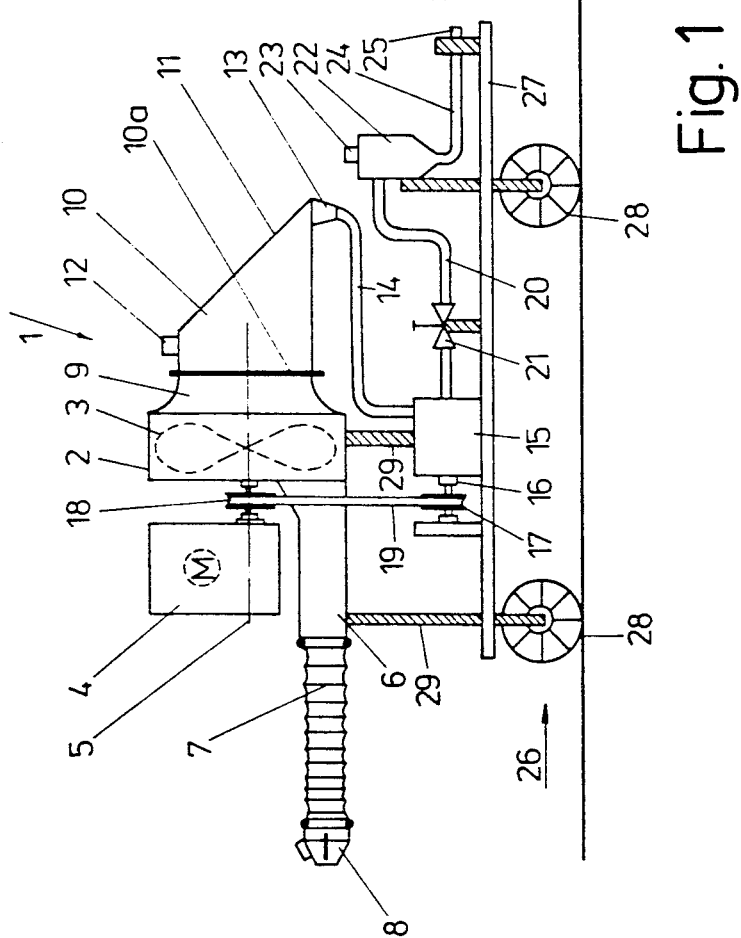
FIG. 1 is a schematic side-elevational view of a waste disposal apparatus.
Figure 2:
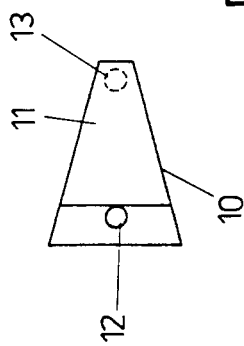
FIG. 2 is a top-plan view onto the collection container.

The blower 2 with its rotor 3 is driven by a motor 4, where the motor 4 and the rotor 3 are disposed on a shaft 5. On the one hand, the blower 2 is furnished with a suction connection piece 6. A tube 7 with a special suction device 8 or, respectively, 8a is connected to the suction connection piece 6. On the other hand, there is furnished a discharge connection piece 9, which forms the entrance opening 10a for a collection container 10. The collection container 10 exhibits an inclined impact wall 11 disposed at the opposite side, and an air suck off opening 12 is disposed at the upper side of the impact wall 11. A foam withdrawal funnel 13 is disposed at the lower side of the inclined impact wall 11. The disintegrated and concentrated foam is sucked off via a line 14 from the funnel 13 with a pump 15 and, upon passage of the disintegrated and concentrated foam, is further reduced by the pump 15. The pump 15 is driven by the motor shaft 5. For this purpose, a belt pulley 17 is disposed on the pump shaft 16 and a belt pulley 18 is furnished on the motor shaft 5. A belt 19 completes the belt drive. A discharge line 20 with a blocking member 21 is led to a cyclone 22 from the pump 15. The cyclone 22 includes an air withdrawal connection pipe 23 with over-pressure control and a discharge line 24. The lines 14, 20, and 24 can be formed from tube hoses. Advantageously, a special-coupling 25 can be employed at the end of the tube hose line 24 for connecting of a firefighting hose. The device 1 is mounted to a vehicle 26 according to the embodiment of FIG. 1, where the vehicle 26 comprises a floor plate 27, a driving device 28 and a support members 29.

The foaming-agent water mixture exits from the cyclone. This foaming-agent water mixture can be further disposed of in different ways. Four different possibilities are illustrated for this purpose in the embodiment shown. For example, the discharge line 30 can be led to different waste disposal devices. The discharge line 30a is led to a waste water canal 31, from which the mixture is led to the water clearing and/or purification plant or sewage treatment plant. The mixture is led to a tank truck 32 via a line 30b, and the tank truck 32 brings the mixture to a remotely disposed waste discharge installation. Such waste discharge can be, for example, a water clearing and/or purification plant. The foaming agent-water mixture is accepted in the water clearing and/or purification plant and is added to the liquid volume of the water clearing plant in metered volumina. Thus, a waste discharge of the mixture is assured based on its capability of being biologically degraded and the chemical and biological balance of the water clearing/purification plant is assured. Furthermore, the mixture can also be entered into special biological waste discharge plant operating with bacteria. A large sedimentation container is designated with 33, to which the mixture is fed via a line 30c. The foaming agent is deposited and sedimented by addition of flocculation auxiliary agents via the line 37. The pure water can be withdrawn in this case via a withdrawal line 34 and the foaming agent can be taken out by way of a line 35 as a floor deposit. The fourth waste disposal unit comprises a mixing member 36 and a following filter 38. The mixture to be waste disposed is fed by a line 30d to the mixing 36 and a flocculation auxiliary agent or, respectively a foaming agent binder is added via line 37a. The water is separated from the foaming agent in the filter 38 and the water is withdrawn as pure water at device 40 or, respectively led to a channel 31. The foaming agent is withdrawn via a line 39 and then can further be employed or, respectively be deposited in a sanitary landfill, or can be burned.

A further embodiment of the waste disposal apparatus is illustrated in FIG. 3. The collection container is furnished as a turn channel 41 with a deflection of 90° in downward direction and further contains deflection sheet metal pieces 47 and is furnished with a discharge connection pipe 13 at its lower end. A sieve centrifuge 42 with a sieve cover 50 is disposed below the collection container at a distance 49. A line 43 is led to a container 44 and very low with the light foam component share is collected in the container 44 and is fed from there with a pump 45 to the discharge pipe 46. A bypass 51 with a blocking member 56 can branch off from the line 46 and can be introduced into the upper part of the centrifuge 42. This way, part of the liquid can be splashed onto the upper edge of the centrifuge drum and this prevents overstepping of the foam out of the centrifuge 42. An admixture device 59 for a foam disintegrating agent is furnished in the bypass 51. The centrifuge 42 comprises a casing 58 wherein a centrifugal drum 55 with a sieve cover 50 is rotatably supported and can be driven by a motor 57. An extension pipe 54 connected to the discharge connection pipe 13 can be introduced into the interior of the centrifugal drum 55.

The centrifuge 42 and the container 44 are supported on the floor plate 27 of the vehicle 26.

A further embodiment of the collection container is illustrated in FIG. 4, which collection container comprises a tube 48 which narrows down from the entrance cross-section 52 to the exit cross-section 53 in a ratio of between 1.2 and 3.0 to 1. The deflection sheet metal pieces 47 can be eliminated in this embodiment.

It is a further feature of the invention that also base discharge devices 36 and 38 are mounted to a vehicle and thus can belong to the waste discharge apparatus 1.

Figure 5:
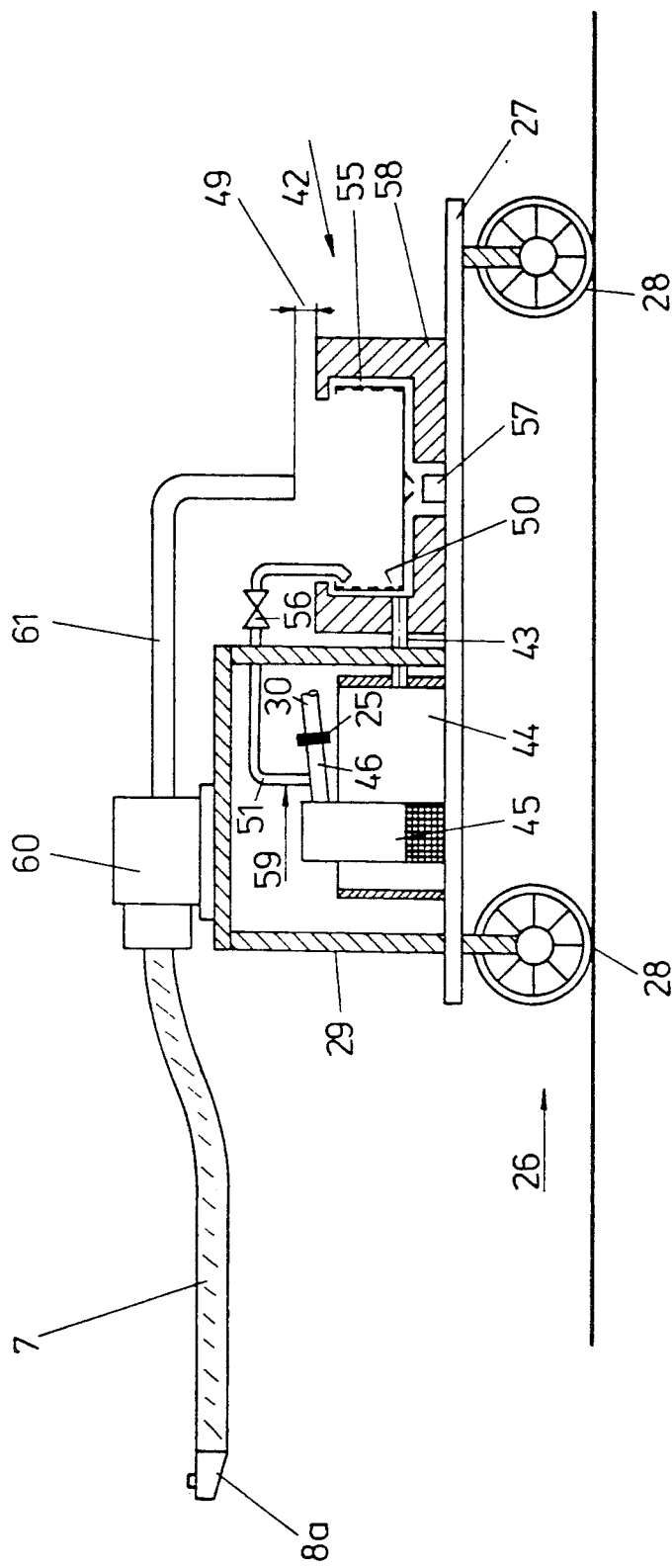
FIG. 5 is a side-elevational view for the treatment of a very low foamed low expansion foam.
Figure 6:
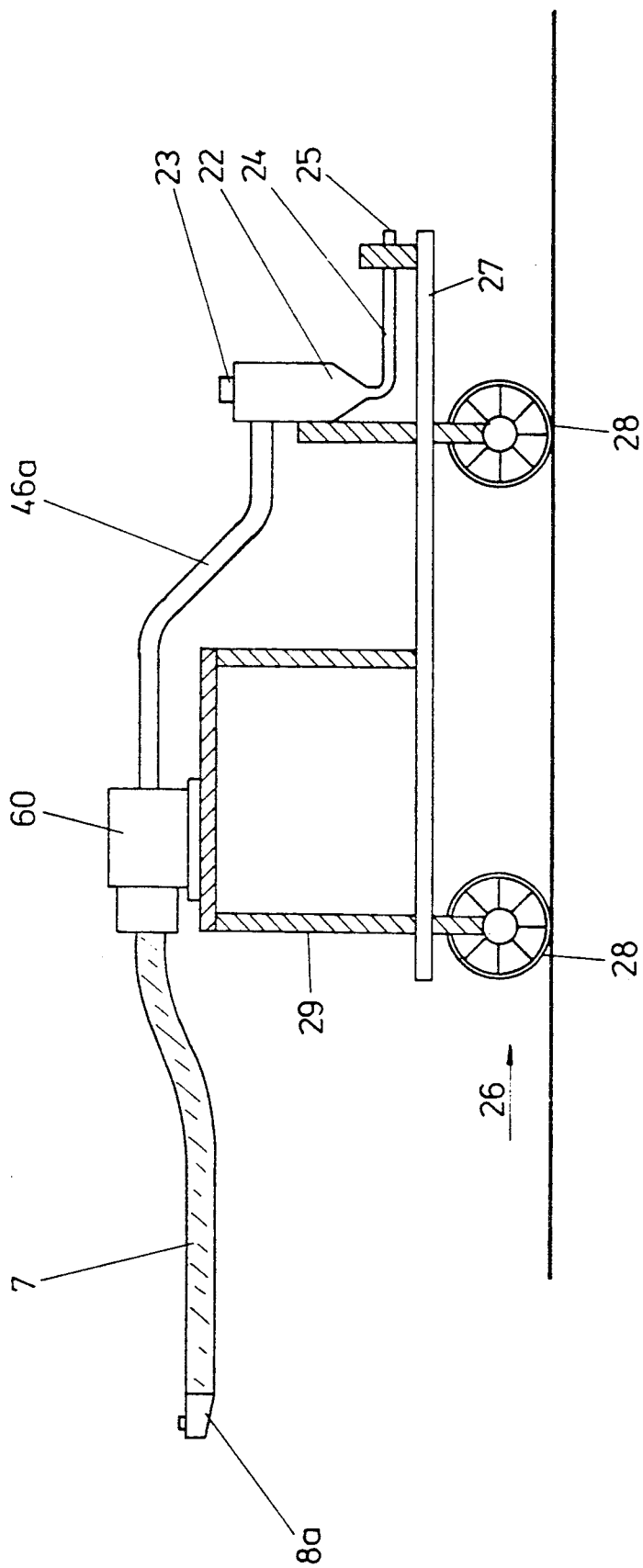
FIG. 6 is a side-elevational view for another treatment of a very foamed low expansion foam.
Figure 7:
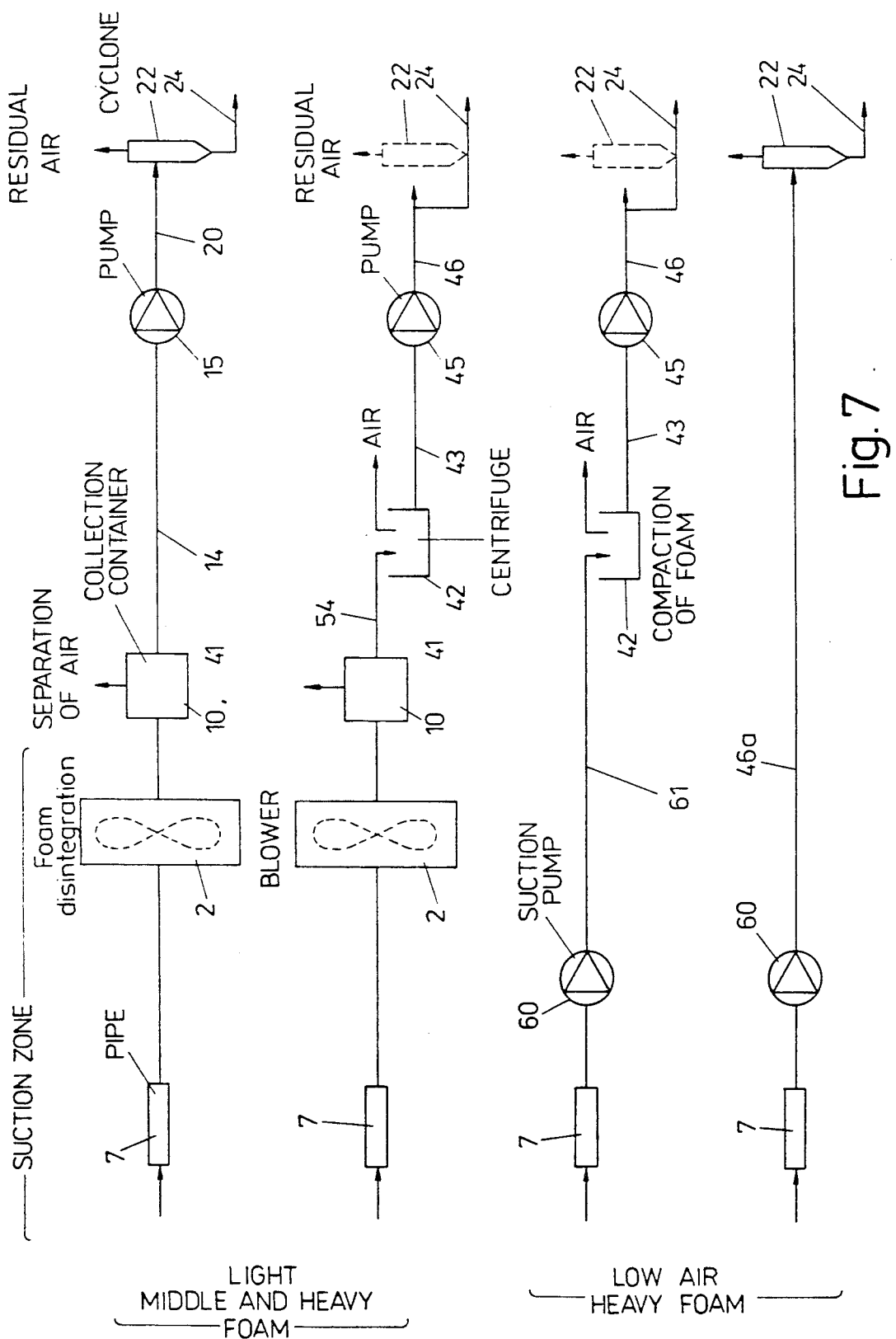
FIG. 7 is a schematic diagram survey of the foam disposal systems according to the invention.

Two embodiments are illustrated in FIGS. 5 and 6, which allow to environmentally-safe dispose a low foamed low expansion foam with the expansion ratio of the foam of under 10. The disintegration of such a foam is not necessary. Consequently, the blower can be dispensed with. In this case, where the foam is sucked in/drawn in by way of a pump 60 via the tube 7. Concentration of the foam and thus removal of the air can be performed with the sieve centrifuge 42 or with the cyclone 22 via line 61 or 46a. Also, a cyclone 22 can be connected following to the sieve centrifuge 42 in case of employment of such a sieve centrifuge 42. The line 46 is then introduced into the cyclone 22. A schematic survey diagram relating to the FIG. 1, 3, 5, and 6 is illustrated in FIG. 7. It can be recognized that the line 46 can be fed directly into the line 24 with bypassing of the cyclone 22. This embodiment also employs the feature is fed to FIG. 1a in that the mixture of the waste disposal 1a.

It will be understood that each of the elements described above, or two or more together, may also find a useful application in other types of waste disposal processes and devices differing from the types described above.

While the invention has been illustrated and described as embodied in the context of a process and device for an environmentally safe disposal of a fire extinguishing foam or other foams, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from characteristics of the generic or specific aspects of this invention.

What is claimed as new and desired to be protected by Letters Patent is set forth in the appended claims.

1. A method for the waste disposal of a light- and/or medium and/or heavy foam including a foaming agent used for fire extinguishing purposes comprising
   sucking up the foam with a fan blower;
   passing the foam through this fan blower;
   disintegrating the foam in the fan blower;
   setting an exit speed of the foam in the blower to a sufficient value for forming a heavier consistency material;
   then concentrating the foam of heavier consistency by separation of the largest part of air;
   separating residual air from [the] a foaming agent water mixture in a following stage for further treatment.

2. The method according to claim 1 further comprising
   withdrawing concentrated foam with a pump; and
   separating the residual air by way of a cyclone precipitator.

3. The method according to claim 1 further comprising
   deflecting disintegrated foam;
   feeding disintegrated foam to an open centrifugal stage; and
   leading the further reduced foaming agent water mixture from the open centrifugal stage via a pump stage.

4. The method according to claim 1 further comprising
   feeding the foaming agent water mixture into a tank truck or into a container for further waste disposal.

5. The method according to claim 1 further comprising
   feeding the foaming agent water mixture to a precipitation stage for further waste disposal; and
   separating a concentrate of a foaming agent and water under addition of auxiliary agent provided as a binder for the foaming agent.

6. The method according to claim 1, wherein a high expansion foam generator without diffusor and purifier grid with a closed air suction port is employed as a blower.

7. The method according to claim 1 further comprising
   driving the pump for the transport of the concentrated foam by the drive of the blower or, respectively, of the high expansion foam generator; and
   maintaining a transporting pressure of at least one bar at the output of the pump.

8. The method according to claim 1 further comprising
   advancing the waste disposal unit into the foam for waste disposal of the foam;
   leading the advancing waste disposal unit along a meander shaped path.

9. A method for waste disposal of low foamed low expansion foams comprising
   sucking the foam up with a pump;
   leading the foam through the pump;
   separating the residual air from the foaming agent water mixture in a following stage for a further treatment.

10. The method according to claim 9 further comprising employing a cyclone effect for separating the residual air.

11. The method according to claim 9 further comprising
    separating the residual air by means of a centrifugal effect; and
    further transporting the resulting water mixture with an additional pump.

12. The method according to claim 11 further comprising
    employing a cyclone stage following to the centrifugical stage.

13. A method for the waste disposal of a light- and/or medium and/or heavy foam used including a foaming agent for fire extinguishing purposes wherein the foam is sucked up with a fan blower, is passed through this fan blower and is disintegrated thereby under increase of the exit speed into a heavier consistency, which foam of heavier consistency is in the following further concentrated by separation of the largest part of the air and is separated for further treatment in a following stage from the residual air, and the residual air is separated from [the] a foaming agent water mixture in the following stage for further treatment, and wherein the foaming agent water mixture is fed into a tank.

14. The method according to claim 13, wherein the concentrated foam is sucked off with a pump and the residual air is separated by way of a cyclone precipitator;
    wherein the disintegrated foam is deflected and is fed to an open centrifugal stage and the further reduced foaming agent water mixture is led further from the open centrifugal stage via a pump stage;
    wherein the foaming agent water mixture is fed into a tank truck or into a container for further waste disposal;
    wherein the foaming agent water mixture is fed to a precipitation stage for further waste disposal and where a concentrate of a foaming agent and water are separated under addition of auxiliary agent provided as a binder for the foaming agent;
    wherein a light foam generator without diffusor and purifier grid with a closed air suction port is employed as a blower;
    wherein the pump for the transport of the concentrated foam is driven by the drive of the blower or, respectively, of the light foam generator and where the transporting pressure of at least one bar is present at the output of the pump;
    wherein the waste disposal of the foam is performed by an advancing approach of the waste disposal unit into the foam, which approach is performed preferably along a meander shaped path.

15. The method according to claim 13 further comprising employing low foamed heavy foams useful in connection with fire extinguishing for waste disposal;

wherein the foam is sucked in by way of a pump, wherein the foam is then led through this pump and wherein the residual air is separated from the foaming agent water mixture in a following stage for a further treatment;

wherein the residual air is separated by way of a cyclone effect;

wherein the residual air is separated by means of a centrifugal effect and is further transported with an additional pump;

wherein the centrifugal stage is followed by a cyclone stage.

* * * * *